United States Patent
Kreek et al.

(10) Patent No.: US 8,689,204 B2
(45) Date of Patent: Apr. 1, 2014

(54) METHODS AND TOOLS FOR CREATION OF READ-ONLY-MEMORY SOFTWARE BINARY IMAGES AND CORRESPONDING SOFTWARE PATCHES

(75) Inventors: Conrad Kreek, Waterloo (CA); Sean Simmons, Waterloo (CA); Jacob Burkholder, Kanata (CA); Tran Phat, Waterloo (CA); Jonathan Swoboda, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1073 days.

(21) Appl. No.: 12/474,741

(22) Filed: May 29, 2009

(65) Prior Publication Data

US 2010/0223602 A1  Sep. 2, 2010

Related U.S. Application Data

(60) Provisional application No. 61/156,494, filed on Feb. 28, 2009.

(51) Int. Cl.
| | |
|---|---|
| *G06F 9/44* | (2006.01) |
| *G06F 9/445* | (2006.01) |
| *G06F 12/06* | (2006.01) |
| *G06F 12/02* | (2006.01) |
| *G06F 11/10* | (2006.01) |

(52) U.S. Cl.
CPC .............. *G06F 8/65* (2013.01); *G06F 12/0638* (2013.01); *G06F 12/0292* (2013.01); *G06F 12/0246* (2013.01); *G06F 11/1016* (2013.01)
USPC ........... 717/168; 717/174; 711/202; 711/102; 711/103; 711/104; 714/768

(58) Field of Classification Search
CPC . G06F 9/4401; G06F 11/302; G06F 11/3051; G06F 12/0638; G06F 8/64; G06F 8/65; G06F 8/66; G06F 12/0804; G06F 11/1016
USPC .................................. 717/168; 711/101–104
See application file for complete search history.

(56) References Cited

U.S. PATENT DOCUMENTS

| | | | | |
|---|---|---|---|---|
| 5,408,672 A | * | 4/1995 | Miyazawa et al. | .............. 712/37 |
| 5,481,713 A | | 1/1996 | Wetmore et al. | |

(Continued)

FOREIGN PATENT DOCUMENTS

| | | |
|---|---|---|
| EP | 0215992 A | 4/1987 |

OTHER PUBLICATIONS

Wimmer, K., "Field-Programmable Patches Simplify Firmware Maintenance", EDN Electrical Design News, Reed Business Information, Highlands Ranch, CO, US, vol. 26, No. 9, Apr. 29, 1981, pp. 139-144.

(Continued)

*Primary Examiner* — Lewis A Bullock, Jr.
*Assistant Examiner* — Tina Huynh
(74) *Attorney, Agent, or Firm* — Norton Rose Fulbright Canada LLP

(57) ABSTRACT

There are described tools and methodologies for building Read Only Memory (ROM) mask software images and the corresponding data/code patching software images. One method is for creating ROM mask content having patch references included therein whereby patch reference errors are detected and corrected. A software patch for a ROM mask with existing patch references may then automatically be created.

19 Claims, 12 Drawing Sheets

(56) References Cited

U.S. PATENT DOCUMENTS

| | | | |
|---|---|---|---|
| 5,790,860 A * | 8/1998 | Wetmore et al. | 717/122 |
| 6,237,120 B1 * | 5/2001 | Shimada et al. | 714/726 |
| 6,260,157 B1 * | 7/2001 | Schurecht et al. | 714/6.13 |
| 6,314,024 B1 * | 11/2001 | Kakihara | 365/185.09 |
| 6,330,712 B1 * | 12/2001 | Iwaya | 717/100 |
| 6,338,435 B1 | 1/2002 | Carper | |
| 6,970,565 B1 * | 11/2005 | Rindsberg | 380/270 |
| 7,290,081 B2 | 10/2007 | Parthasarathy et al. | |
| 7,310,800 B2 | 12/2007 | Brouwer et al. | |
| 7,484,083 B1 * | 1/2009 | Ilyasov | 713/1 |
| 7,533,240 B1 * | 5/2009 | Urabe et al. | 711/202 |
| 2002/0120810 A1 * | 8/2002 | Brouwer | 711/103 |
| 2003/0217227 A1 * | 11/2003 | Parthasarathy et al. | 711/118 |
| 2004/0111680 A1 * | 6/2004 | Lim et al. | 716/1 |
| 2004/0128471 A1 * | 7/2004 | Oakley et al. | 711/220 |
| 2004/0163080 A1 * | 8/2004 | Menon et al. | 717/168 |
| 2005/0228959 A1 | 10/2005 | D'Albore et al. | |
| 2007/0198787 A1 * | 8/2007 | Jessani et al. | 711/159 |
| 2007/0294599 A1 * | 12/2007 | Edlund | 714/54 |
| 2008/0184072 A1 * | 7/2008 | Odlivak et al. | 714/32 |
| 2008/0216065 A1 * | 9/2008 | Oka | 717/168 |

OTHER PUBLICATIONS

"Partial European Search Report", issued by the European Patent Office on Nov. 3, 2009 with respect to European Patent Application No. 09161602.9.

Scott, Jeff et al., "Complexity-Effective Enhancements to a RISC CPU Architecture", Embedded Platform Systems, Motorola, Inc., Austin, TX.

"Correctly detect Python version for pywrap", [online], [retrieved on May 7, 2009], https://lists.launchpad.net/ecryptfs-devel/msg00009.html.

"PatchFactory, Innovative software updating system", [online], [retrieved on May 7, 2009], http://www.agensoft.com/.

"Novell ZENworks Patch Management", [online], [retrieved on May 7, 2009], http://www.novell.com/products/zenworks/patchmanagement/.

"How to master the ROM patch function : Fujitsu", [online], retrieved Mar. 26, 2009], http://www.fujitsu.com/global/services/microelectronics/product/micom/support/knowhow/16lx/hard04.html.

"Software Listing: Software Update Patch Tool Utility", [online], [retrived on May 8, 2009], http://www.sharewareconnection.com/titles/software-update-patch-tool-utility.htm.

Canadian Intellectual Property Office, Examiner's Requisition dated Nov. 6, 2013, issued in Canadian Patent Application No. 2,691,282.

* cited by examiner

METHODS AND TOOLS FOR CREATION OF READ-ONLY-MEMORY SOFTWARE BINARY IMAGES AND CORRESPONDING SOFTWARE PATCHES

CROSS-REFERENCE TO RELATED APPLICATIONS

The present application claims priority under 35 USC§119(e) of Provisional Patent Application bearing Ser. No. 61/156,494, filed on Feb. 28, 2009, the contents of which are hereby incorporated by reference.

TECHNICAL FIELD

The present disclosure relates generally to the development of Read Only Memory (ROM), and more particularly to tools and methodology for building ROM mask software images and the corresponding data/code patching software images.

BACKGROUND

Read-only memory (ROM), also known as firmware, is an integrated circuit programmed with specific data when it is manufactured. ROM chips are used not only in computers, but in most other electronic items as well. There are many different types of ROM, such as PROM (Programmable ROM), FPROM (Field Programmable ROM), EPROM (Erasable PROM), EEPROM (Electrically Erasable PROM), MROM (Mask ROM), and Flash Memory. Each type has unique characteristics, with two things in common: data stored in these chips is nonvolatile, and data stored in these chips is either unchangeable or requires a special operation to change.

There are many instances where it is reasonable or possible for an end-user to upgrade the ROM of a device by completely removing the existing ROM and replacing it with a new ROM. However, in certain cases, it may be desirable or advantageous to simply apply a "patch" to a ROM, in order to fix problems or modify software functionality. A patch is a piece of software that modifies the program executable file so that certain code execution or data accesses are redirected from the ROM to alternative code or data. The "program executable file" is a binary file containing the program the user actually runs and may contain certain software patches that alter program execution. In these cases, the program executable file is located in Random Access Memory (RAM), flash, or other memory that works along with the code/data in ROM, and it is possible and reasonable for the end-user to upgrade this part of the software that is not in ROM.

Creating data and code patches for a ROM mask is a laborious and error prone procedure. An individual must manually identify each code/data set in ROM, make decisions on what to patch, and on how to patch it. It is desirable to have a method to overcome some of the drawbacks of the prior art.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1:
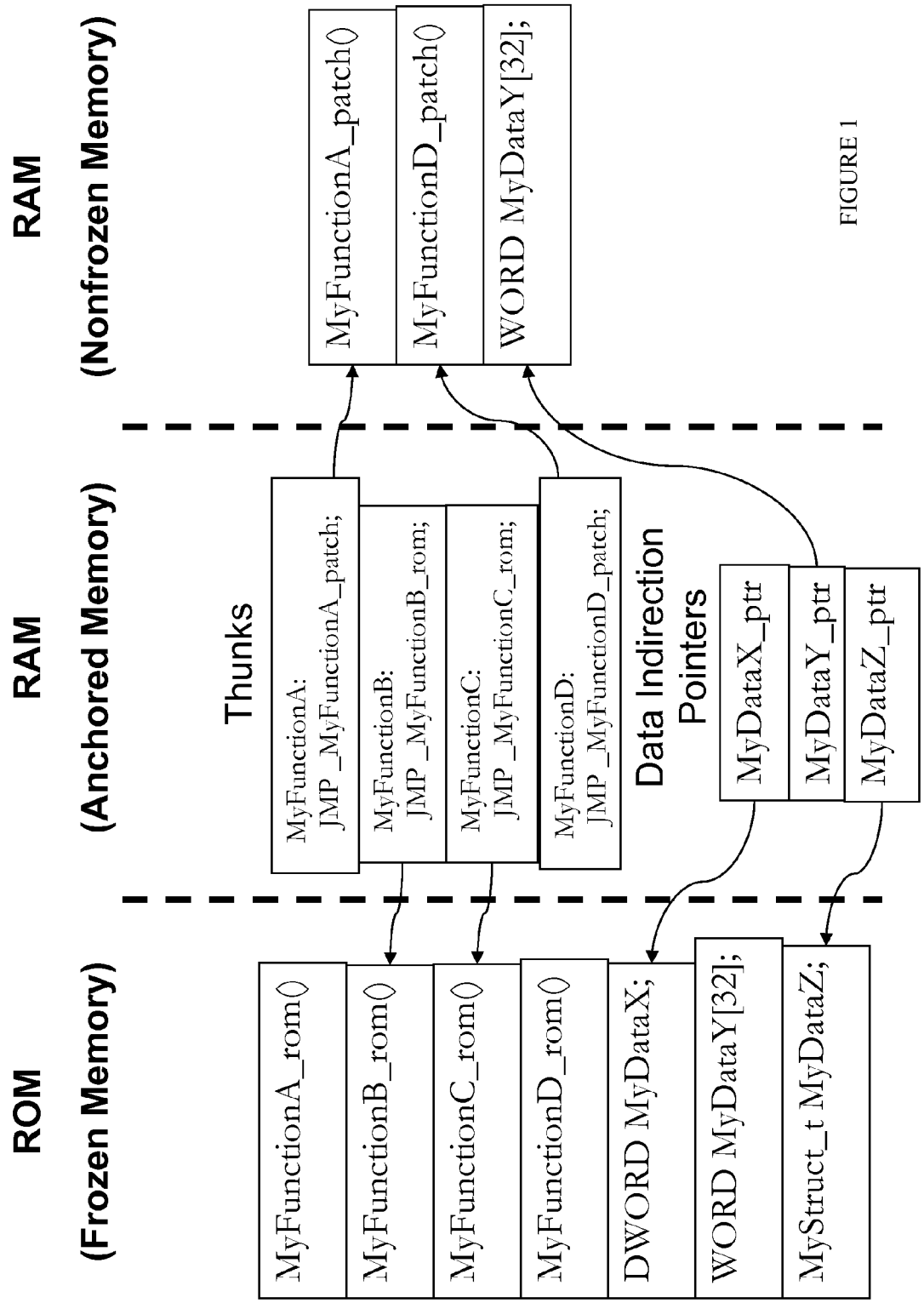
FIG. 1 is a diagram showing the ROM patching mechanisms in accordance with an example embodiment.

In some aspects there is provided a method for creating Read Only Memory (ROM) mask content, the method including: creating a plurality of single ROM object files, selected ones of functions and data objects in the object files having a patch reference added thereto; linking the plurality of single ROM object files together into a combined file; detecting patch reference errors in the selected ones of functions and data objects by validating a start and a destination of each patch reference; correcting patch reference errors for inappropriate patch references; and generating the mask content from the combined file.

In an example embodiment, the creating the plurality of single ROM object files includes creating a source code file; converting a file format of the source code file into assembly code and compiling an assembly file; selecting at least one of functions and data objects in the assembly file in accordance with a predetermined parameter; and adding the patch reference to each the selected ones of functions and data objects.

In some aspects there is provided a method for automatically creating a software patch for a ROM mask, the method including: receiving a list of patchable functions and/or data objects having patch references inserted at the time of creation of the ROM mask; comparing an original ROM assembly file used to make the ROM mask with an updated ROM assembly file; applying a first set of rules if the function or data object has a patch reference and recording results in an output file; applying a second set of rules if the function or data object does not have a patch reference and recording results in the output file; and creating the software patch from the output file.

In an example embodiment, applying a first set of rules includes applying a first set of rules includes: discarding deleted functions or data objects and pointing the patch reference to an error; renaming changed functions in ROM with a patch suffix and saving them to an output file; discarding unchanged functions or data objects; renaming unchanged functions that are not in ROM and saving them to the output file; and saving changed data objects to the output file.

In an example embodiment, applying a second set of rules includes saving functions that are not in ROM to the output file; discarding functions that are in ROM and have not changed; logging an error for functions that are in ROM, have changed, and are not static; saving functions that are in ROM, have changed, and are static, marking all calling functions as changed, and reprocessing all calling functions; logging an error for all changed data objects; and discarding unchanged data objects.

For the purposes of the present description, three types of memory will be referred to as follows. Frozen memory is found in ROM and has contents that cannot change or move. Anchored memory is found in RAM and has contents that can change but symbol locations cannot move. Non-frozen memory is found in RAM and has contents that can change and move. Patch code is found in non-frozen memory.

A patching reference is understood to mean a reference, such as an indirection pointer, a thunk entry or other, that is associated with either a function or a data object at the time of creation of the ROM mask, for utilization at a later time when the function or data object is patched, i.e. a problem is fixed or software functionality is modified. Various types of patch references will be known to those skilled in the art and the example embodiments herein should not be limited to indirection pointers and thunk entries.

A thunk should be understood as being a means for addressing frozen or non-frozen memory, whereby a single layer of indirection is added to each function call implemented. Each function located in ROM is renamed by giving it a "_rom" suffix and a new function is created in anchored memory using the original function name. This function only calls the renamed original function but can be changed if a function is patched at a later time (this function is known as a "thunk"). This allows a future patch function to be called instead of the original merely by calling the new patch function from the thunk. Build tools may by used to add the thunk layer and rename the original function, or alternatively, these steps are done manually.

A data indirection pointer should be understood as being an addressing mode comparable to a thunk but for data objects instead of functions. Data objects placed in ROM make reference to variables which have been placed in a special section. This section is placed at a fixed, well chosen address and does not move for the life of a ROM mask. A tool is provided that verifies that all data patch references from sections placed in ROM satisfy this constraint and produce warnings or build errors if not. In one example embodiment, all variables placed in this section are pointers, which are statically initialized to point to the actual data to be referenced from ROM code. In this case, the source code is modified indirectly through the pointer when accessing the variable in question. In another example embodiment, all of the pointers which are referenced from ROM code are placed in a same source file. This avoids the need to maintain strict ordering of source files. Alternatively, multiple source files are used and the order of the object files which contain pointers referenced from ROM code are fixed by explicitly listing them in the linker description file. Other methods of using multiple source files may also be used, as known to a person skilled in the art. The special section placed in RAM is initialized on startup. In one example embodiment, the initialization images for all such sections are stored externally in the form of LDR blocks, the address of which is passed to the operating system at boot time in order to perform the initialization. In this way, the source file(s) containing the data pointers may be freely modified without breaking ROM mask compatibility so long as no pointers are removed and they are always added at the end of the section. For example, the memory region that a variable is placed in may be changed so long as the pointer used to reference it is not moved.

Reference is made to FIG. 1 which illustrates an exemplary embodiment of each type of memory. Functions A through D and Data objects X, Y, and Z are found in ROM in frozen memory. These functions and data objects cannot move and cannot be changed. Once a ROM mask is released with these functions and/or data objects, they are fixed. Thunks A through D and Data Indirection Pointers X, Y, and Z are found in RAM and represent anchored memory. Code in the ROM function jumps to thunks in a table; the table is replaced with short functions that either load the applicable library or jump to the appropriate point in an already-loaded library. In FIG. 1, each thunk in anchored memory references either a function in frozen memory or a function in non-frozen memory. Each data indirection pointer in anchored memory references either data in frozen memory or data in non-frozen memory. The ROM patches, for functions and data, are found in non-frozen memory. In general, when a function or data is patched, the copy in ROM gets ignored and a redirection occurs to the patch in non-frozen memory via a patch reference in anchored memory.

When a ROM mask is initially created, patch references are inserted to a selected set of functions, data objects, or both. The patch references point to anchored memory. Until a patch is actually provided, the location in anchored memory points back to the original function/data object in frozen memory. When a patch is deployed, the location in anchored memory will then point to a location in unfrozen memory, as per FIG. 1.

Figure 2:
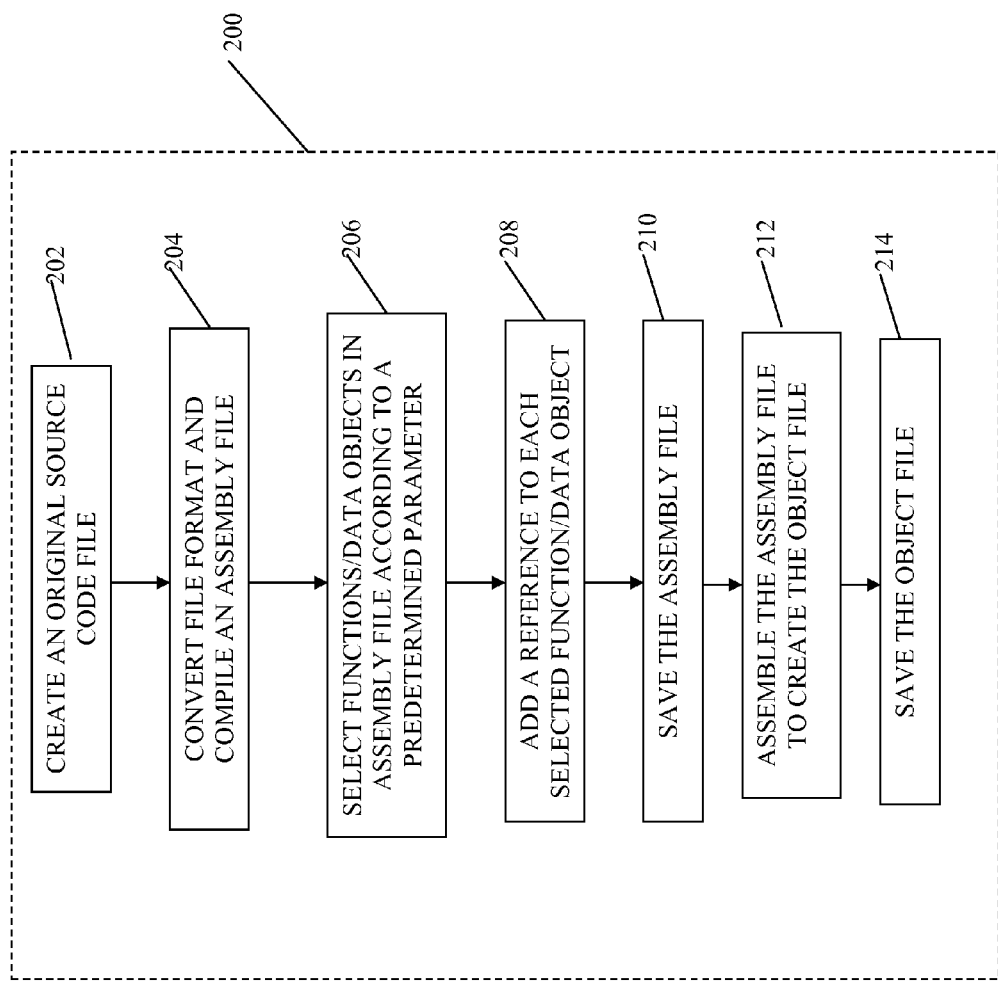
FIG. 2 is a flowchart illustrating a method for creating a single ROM mask object file, in accordance with an example embodiment.

Reference is made to FIG. 2, which illustrates a method for creating a single ROM mask object file in accordance with an example embodiment. An original source code file is created 202 as per known techniques in the art. The source code file is taken as input in a compiler. If the file contains data objects, parameters indicating code sections for inclusion or exclusion in ROM and compiler Position Independent Code (PIC) options are also provided to the compiler. An assembly file is then compiled from the original source code file 204. A given number of functions/data objects are selected in the assembly file in order to make them "patchable", i.e. allowing them to be patched at some time in the future. The functions/data objects are chosen according to a predetermined parameter 206. This predetermined parameter can be the size of the function/data object, a position of the function/data object in the assembly file, a random selection, or any other distinguishing feature of the function/data object that would allow one to be selected while not selecting another one. If the predetermined parameter is size, then a threshold is applied and all functions/data objects are compared to the threshold. Any function/data object exceeding the threshold (or inferior to the threshold) is selected. A patch reference is added to each selected function/data object 208. The assembly file is saved with the added patch references 210. The assembly file is assembled to create an object file 212 and the object file is saved 214. It should be understood that the steps of saving the various files are not necessary in all example embodiments.

Figure 3:
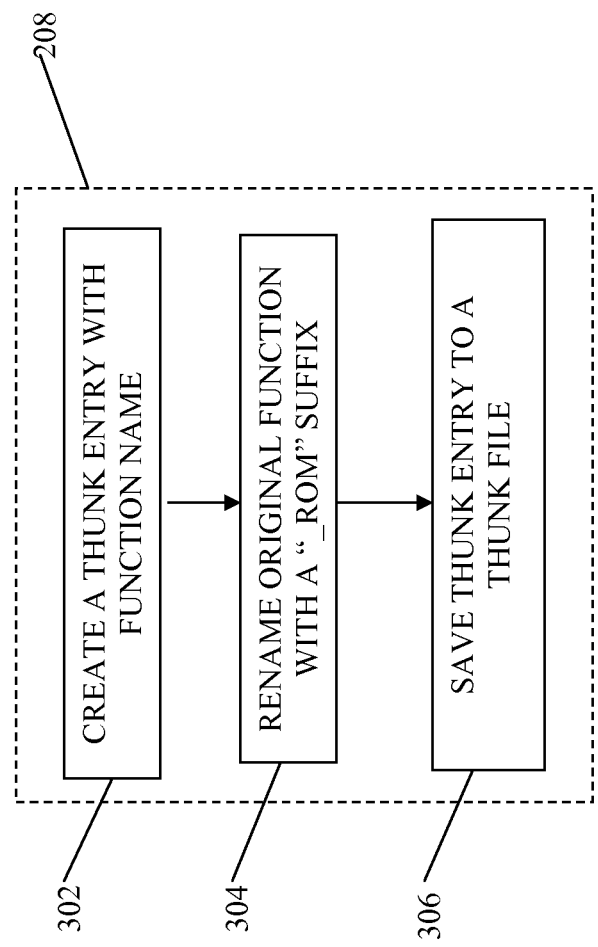
FIG. 3 is a flowchart illustrating a method of adding a patch reference to each selected function, a step from the method of FIG. 2, in accordance with an example embodiment.

In one example embodiment, the patch reference is a vector or a pointer. As per FIG. 1, these vectors or pointers may point to a thunk table, a data indirection pointer, or any other location in RAM that is in anchored memory and therefore changeable but not moveable. Reference is made to FIG. 3, which illustrates one example embodiment of adding a patch reference to each selected function 208. A thunk entry is created with a function name 302. The original function is renamed with a "_ROM" suffix 304 and the thunk entry is saved to a thunk file 306. Other example embodiments are possible, such as one whereby data objects, which are all Position Independent Code (PIC), are compared to a threshold and a list of symbol locations for referenced data objects is created and saved.

Figure 4:
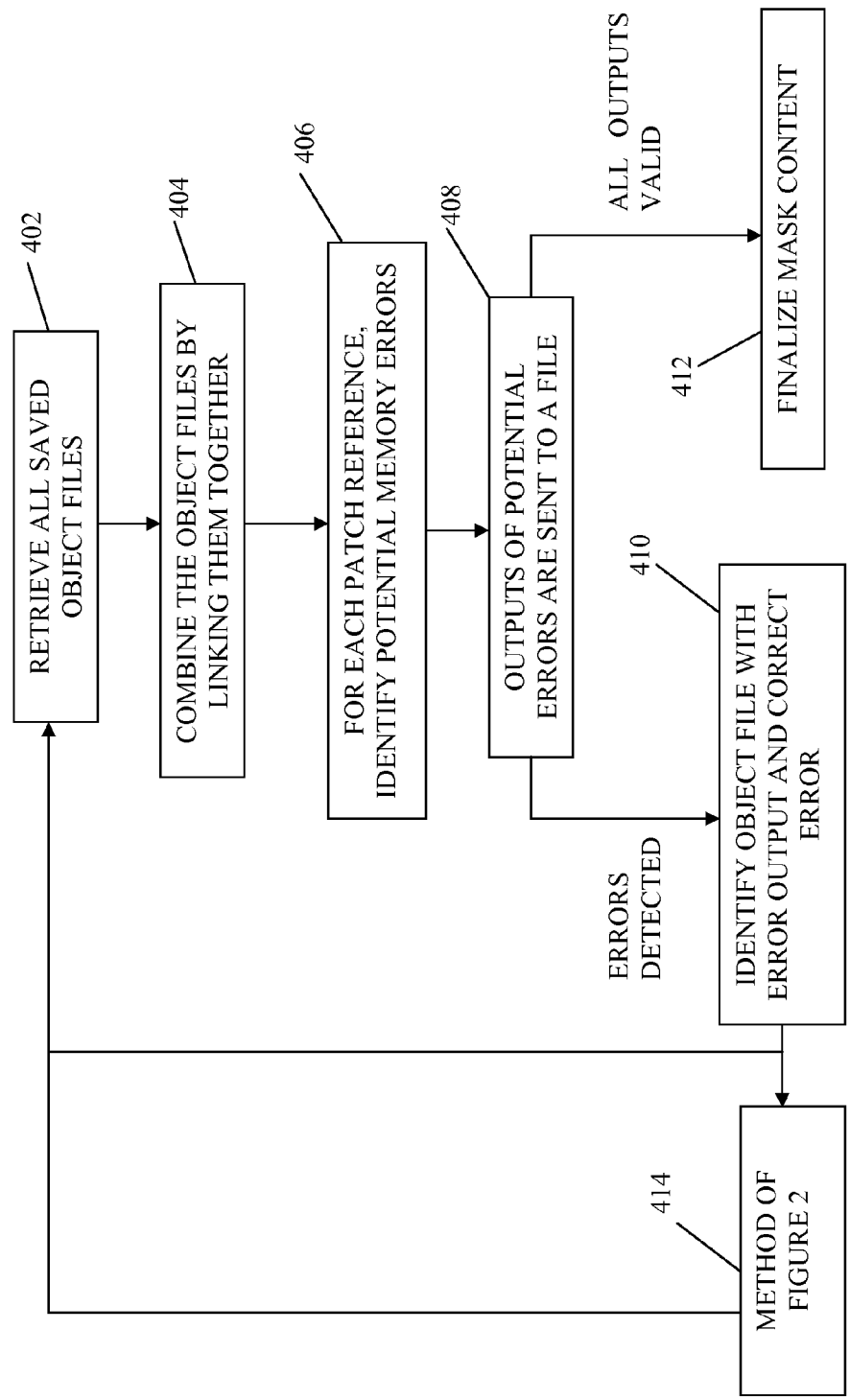
FIG. 4 is a flowchart illustrating a method for creating a mask content from multiple single ROM mask object files.

Reference is next made to FIG. 4, which illustrates a method of creating ROM mask content using a plurality of single ROM mask object files. All saved files are retrieved 402 and combined together 404 to create a single ROM mask binary image file. Once the files are linked, a verification step occurs which is used to identify potential errors in memory for each patch reference that was added when the individual object files were created 406. Potential errors are output and sent to an error file 408. For each error detected, the object file with the error is identified and the error is corrected 410. Once corrected, the updated file is saved and the object files are combined together once again. It may be necessary to repeat the method 200 of FIG. 2 to address certain errors found in a given object file 414. When the error file shows that all patch references are valid, whether this is in the first iteration or after any further iteration of the method, the mask content is finalized 412.

Figure 5:
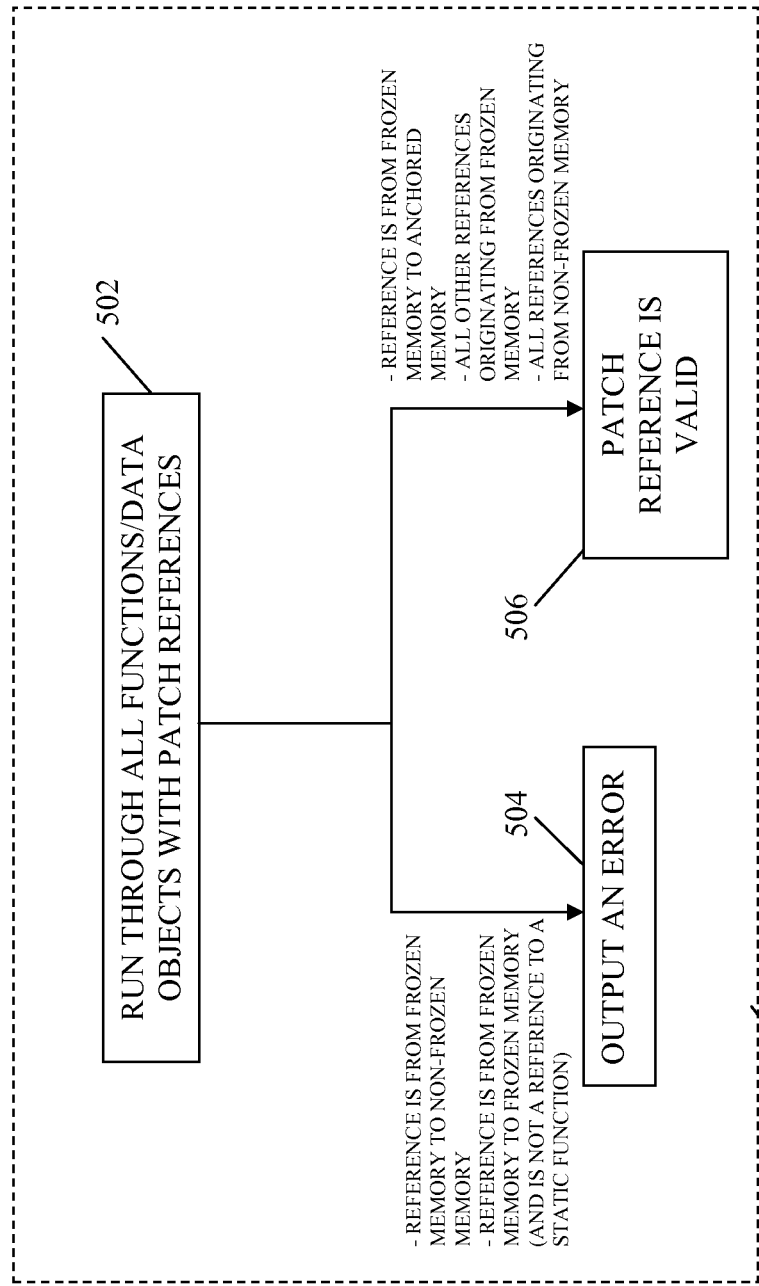
FIG. 5 is a flowchart illustrating a method for running a validation check on all patch references of functions/data objects, in accordance with an example embodiment.

Reference is made to FIG. 5, which illustrates one example embodiment of the step of identifying potential patch reference errors in memory 406 from FIG. 4. All functions/data objects with a patch reference are run-through in this verification step 502. If it is found that a patch reference goes from frozen memory to non-frozen memory, an error is output 504. If it is found that a patch reference goes from frozen memory to frozen memory and the patch reference is not to a static function, an error is output 504. If it is found that the patch reference is from frozen memory to anchored memory, the patch reference is valid 506. For all other patch references originating from frozen memory, other than those that go to non-frozen memory, the patch reference is valid 506. If it is found that the patch reference originates from non-frozen memory, the patch reference is valid 506.

Figure 6:
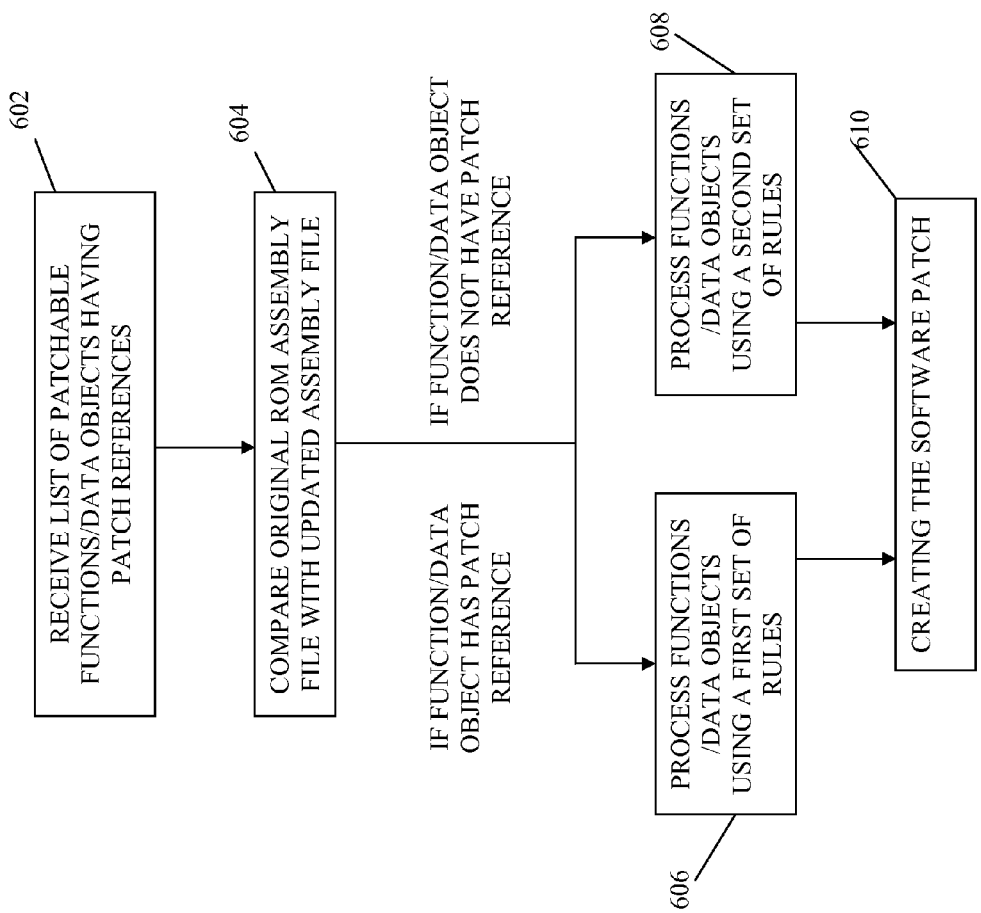
FIG. 6 is a flowchart illustrating a method for creating a ROM patch object file in accordance with an example embodiment.

FIG. 6 illustrates a method for creating a ROM patch object file, in accordance with one example embodiment. A list of patchable functions/data objects having patch references is received 602. The original ROM assembly file is compared with an updated assembly file 604. For each function/data object having a patch reference, the function/data object is processed according to a first set of rules 606. For each function/data object not having a patch reference, the function/data object is processed according to a second set of rules 608. The patch software is then created using the processed functions/data objects 610.

Figure 7:
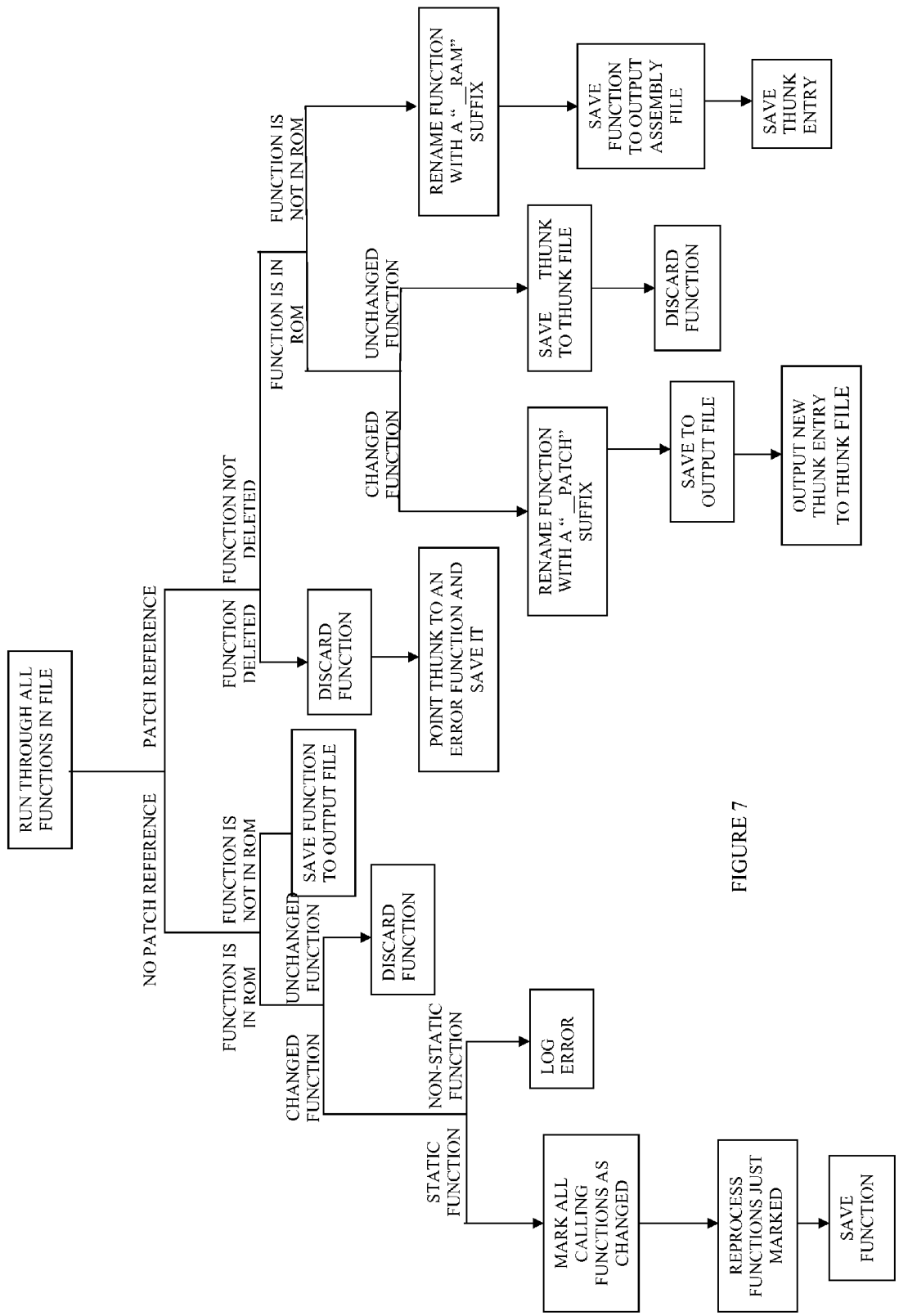
FIG. 7 is a flowchart illustrating a method for processing each function during the creation of the ROM patch object file of FIG. 6, in accordance with an example embodiment.

Reference is now made to FIG. 7, which is a detailed flowchart for an example embodiment of an algorithm used to compare the assembly files and produce a patch object file for functions. The function is first processed to determine if it has a patch reference or not. In the case of a patch-referenced function, if the function was deleted, then it is discarded and the thunk is pointed to an error function and saved. If the function was not deleted, it is determined if the function was in ROM or outside of ROM. For a function outside of ROM, the function is renamed with a "_ram" suffix then saved to the output assembly file and the thunk entry is saved. For a function in ROM, further processing is needed to determine if the function has changed or not. If it has not changed, the thunk is saved to a thunk file and the function is discarded. If the function has changed, it is renamed with a "_patch" suffix, saved to an output file, and a new thunk entry is output to the thunk file.

For a function without a patch reference, any function outside of ROM is saved to the output file. If the function is in ROM, a changed function is saved while an unchanged function is further processed to determine if it is static or not. In the case it is not static, an error is logged. In the case of a static function, all calling functions to this function are marked as changed and the function is question is discarded. All newly changed functions are then reprocessed through the algorithm.

Figure 8:
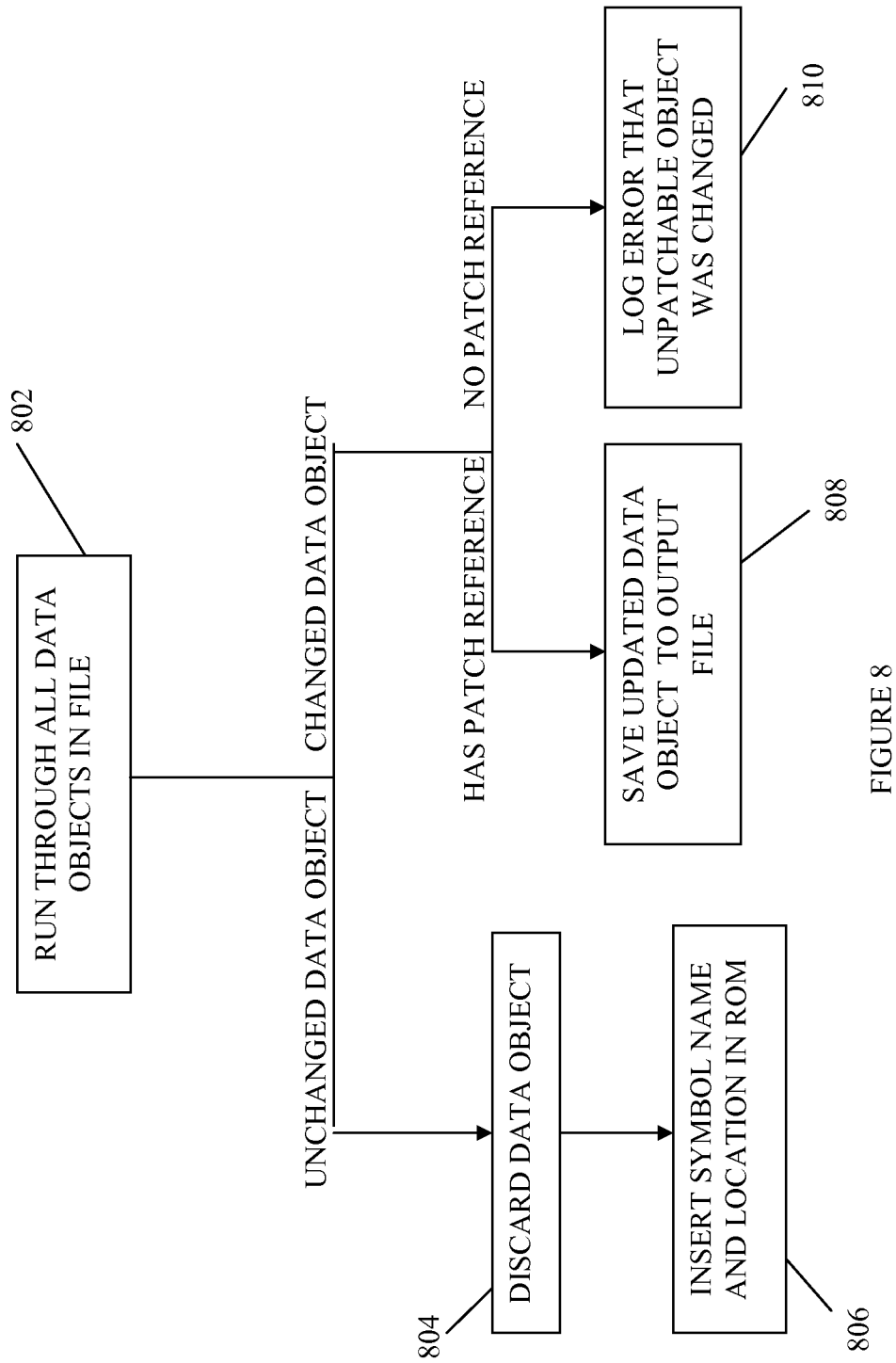
FIG. 8 is a flowchart illustrating a method for processing each data object during the creation of the ROM patch object file of FIG. 6, in accordance with an example embodiment.

FIG. 8 illustrates a method for processing data objects when producing a patch object file, in accordance with an example embodiment. All data objects are run through 802. For an unchanged data object, this data object is discarded 804 and a symbol name and location in ROM is inserted 806. For changed data objects, determination is made as to whether the data objects have patch references or not. A data object with a patch reference is saved (in its updated version) to an output file 808, while an error is logged when a data object without a patch reference is changed 810.

Figure 9:
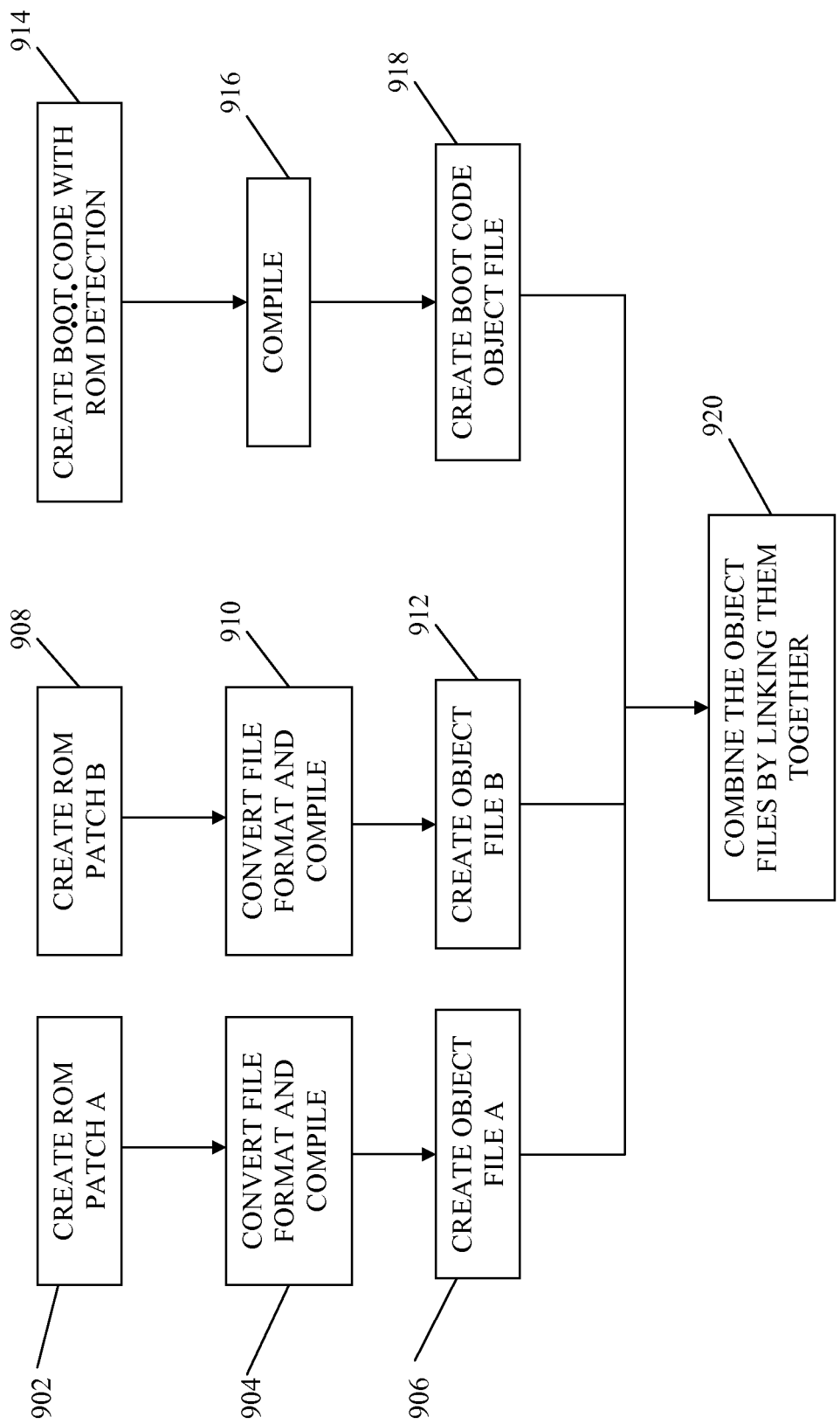
FIG. 9 is a flowchart illustrating a method for creating a binary image capable of supporting multiple ROM versions, in accordance with an example embodiment.

FIG. 9 illustrates a method for creating a binary image file capable of supporting multiple ROM versions. This means that in the case of a bug fix or new software functionality applicable to a device that has been out on the market for a certain time, and for which more than one ROM version exists, all devices can use the same program executable file without concern for the exact version of the device because this single file contains "patches" specific to each ROM version. Without this multi-ROM version program executable file, it is necessary for a user wanting to apply the patch in question to verify the ROM version of the device, find the patch for the corresponding ROM version, and apply this corresponding patch. In some cases, it may be difficult to determine the ROM version in a manual manner. The method of FIG. 9 illustrates an example embodiment whereby this manual version identification step is not required.

An additional benefit of using the method of FIG. 9 relates to the distributor of the device and software in question (rather than the user). In certain situations, it may be the responsibility of the distributor of the software in question to identify the ROM version on the device used by each user in order to distribute the correct program executable file to each user. The resources required to make available separate program executable files for each ROM version and distribute these files to the appropriate users based on the ROM version in each device can prove to be a large expense for an organization or business. The ability to distribute a single program executable file in this scenario can lead to significant cost savings and give the organization or business the flexibility to distribute devices with updated ROM versions at an increased rate during the product lifecycle of the device.

In some aspects, there is provided a method for creating a multi-version software patch for a Read Only Memory (ROM) mask. The method includes creating N ROM patch object files individually; creating a boot code object file including ROM detection code; and linking the N ROM patch object files and the boot code object files together to generate a single executable file that supports N ROM versions.

In at least one example embodiment, the step of creating a boot object file includes providing code for: reading a ROM mask type and version number from a processor of a target device; searching for a ROM patch image corresponding to the ROM mask type and version number; and loading a corresponding ROM patch image into the processor.

In some aspects, there is provided a method for providing a suitable patching software image to a target device. The method includes loading a multi-ROM software patch image onto the target device; reading a ROM mask type and version number from a processor of the target device; searching for a ROM patch image corresponding to the ROM mask type and version number; and loading the suitable ROM patch software image into the processor.

Reference is now made to FIG. 9. At the time of creating the ROM patches, each ROM patch is created separately, whereby ROM patch A is created 902, ROM patch B is created 908, and ultimately ROM patch N is created. Any known technique for creating a ROM patch is suitable. In one example embodiment, the method of creating a ROM patch illustrated in FIG. 6 is used. In this case, error detection is present. Alternatively, no error detection mechanism may be present in the created ROM patch. For each individual ROM patch (A, B, . . . , N), the file format of the original source code file is converted and compiled to create an assembly file 904, 910. Object files are then created from the assembly files for ROM patch A, B, . . . N 906, 912. When creating a ROM patch, the type and version number is provided in the header of the source code file. In another example embodiment, the type and version number of the ROM patch is provided in an alternative location that may be accessed by ROM detection code.

In parallel to the creation of the ROM patches is the creation of boot code with a ROM detection algorithm 914. This code is also compiled 916 and a boot code object file is generated 918. Once all of the individual object files have been generated, they are combined 920 using a software link tool set, in a similar manner as that used to combine multiple ROM mask object files to create a single ROM mask binary image file. The outcome of the combination step is an executable file that supports ROM versions A, B, . . . N.

Figure 10:
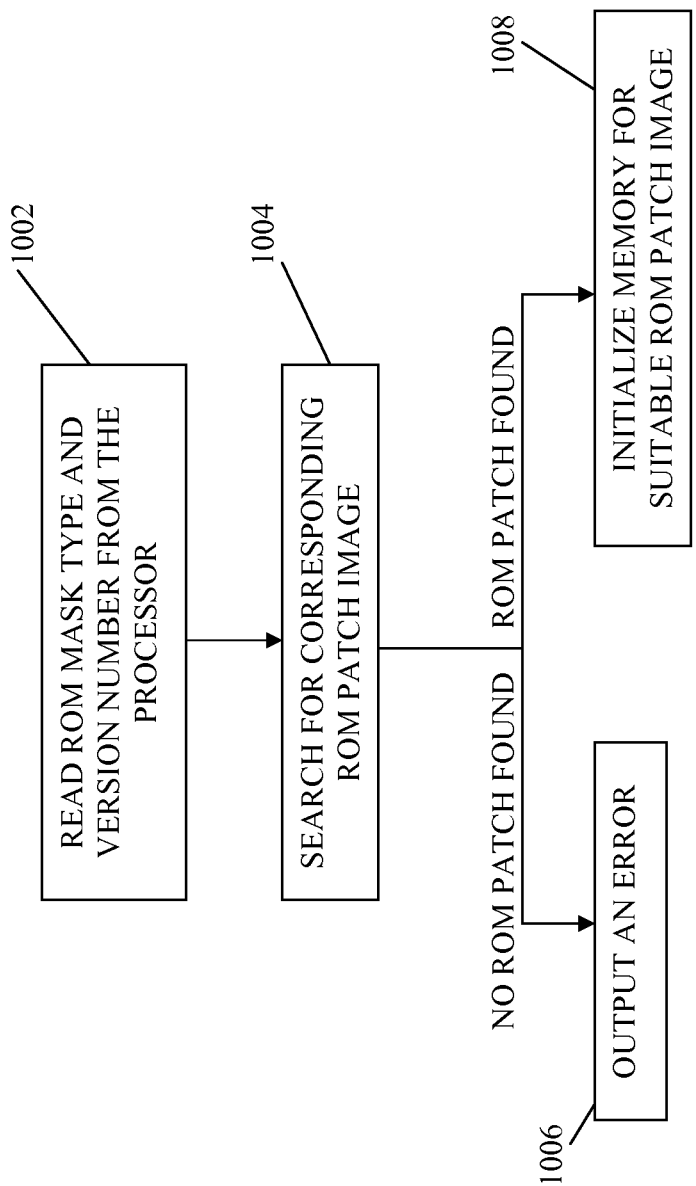
FIG. 10 is a flowchart illustrating a method for detecting a ROM version and loading a correct patching software image.

Reference is now made to FIG. 10, which illustrates the ROM detection algorithm found in the boot code. When a multi-ROM version image is loaded onto a target device, the ROM detection code in the boot code is run. The boot code does not rely on any ROM code or data. In a first step, the ROM mask type and version number is read from the processor of the target device 1002. The mask type and version number is retrieved and a ROM patch image with a corresponding type and version number is searched for among the multiple ROM patch object files 1004. If no suitable ROM patch image is found, then an error is output 1006. Otherwise, the memory of the processor is initialized for the suitable ROM patch image 1008. The suitable ROM patch image is loaded into the device using common techniques known to the person skilled in the art.

Note that this algorithm is also possible on multi-core processors. If the ROM is not accessible to the core that performs memory initialization at boot time, then additional boot code may be provided in the ROM-accessible core to read the ROM type and version and send that information back to the core that will select the ROM patch image and perform initial memory initialization.

Figure 11:
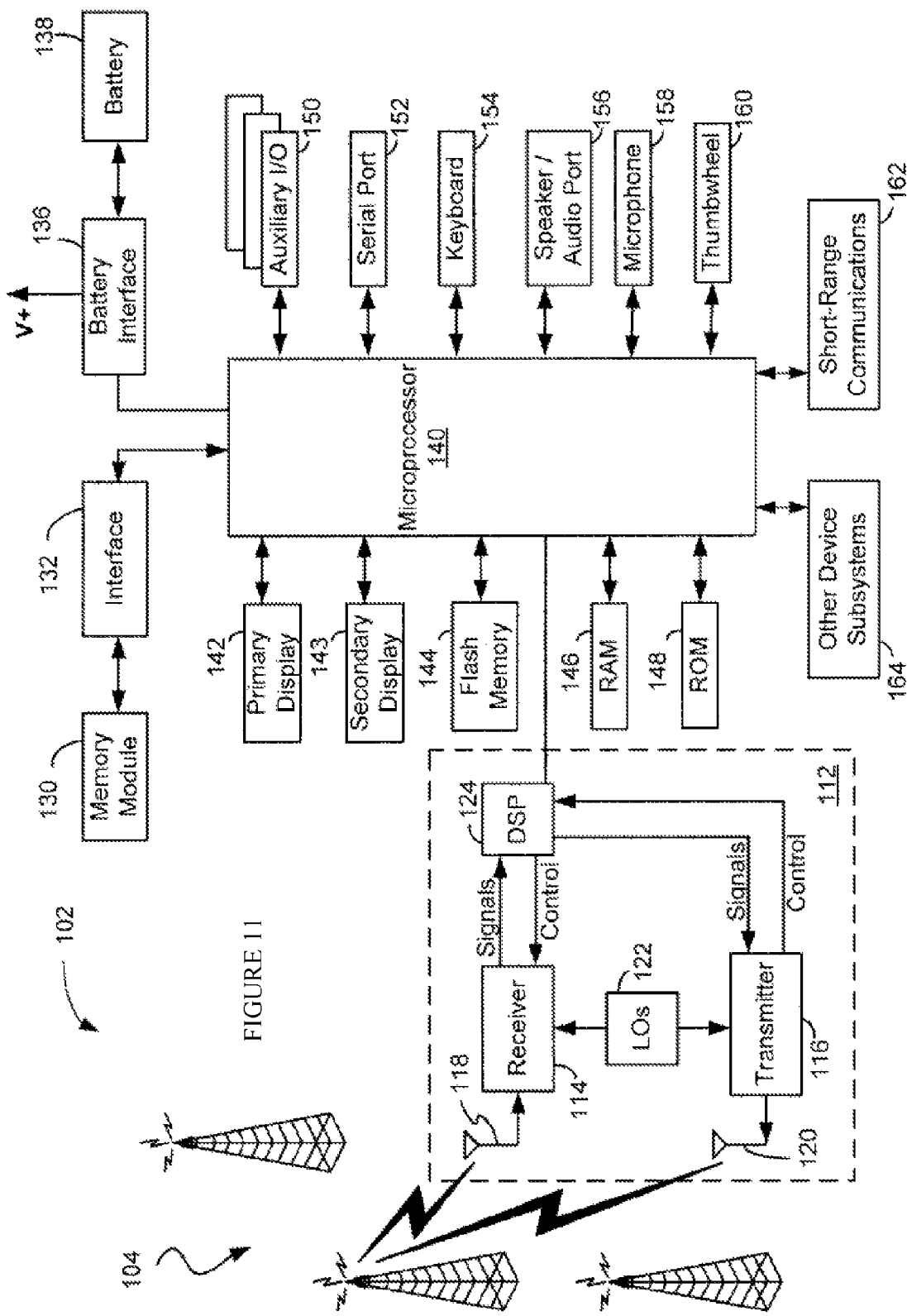
FIG. 11 shows in block diagram form a wireless device suitable for ROM mask patching in accordance with an example embodiment.

The methods described above are applicable to various types of devices, such as wireless devices. Reference is made to FIG. 11, which shows a block diagram illustrating a wireless device 1102 suitable for upgrade in accordance with an example embodiment of the present disclosure. The wireless device 1102 communicates through a wireless communication network 1104. The wireless network 1104 includes antennae, base stations, and supporting radio equipment as for supporting wireless communications between the wireless device 1102 and other devices connected to wireless network 1104. The wireless network 1104 may be coupled to a wireless network gateway and to a wide area network, shown in FIG. 12.

In an example embodiment, the wireless device 1102 is a two-way mobile communication device having at least voice and data communication capabilities, including the capability to communicate with other computer systems. Depending on the functionality provided by the wireless device 1102, it may be referred to as a data messaging device, a two-way pager, a cellular telephone with data messaging capabilities, a wireless Internet appliance, a data communication device (with or without telephony capabilities), a clamshell device, or a flip-phone. The wireless device 1102 may communicate with any one of a plurality of fixed transceiver stations within its geographic coverage area.

The wireless device 1102 may incorporate a communication subsystem 1112, which includes a receiver 1114, a transmitter 1116, and associated components, such as one or more antenna elements 1118 and 1120, local oscillators (LOs) 1122, and a processing module such as a digital signal processor (DSP) 1124. In an example embodiment, the antenna elements 1118 and 1120 may be embedded or internal to the wireless device 1102. As will be apparent to those skilled in the field of communications, the particular design of the communication subsystem 1112 depends on the wireless network 1104 in which the wireless device 1102 is intended to operate.

The wireless device 1102 may send and receive communication signals over the wireless network 1104 after the required network registration or activation procedures have been completed. Signals received by the antenna 1118 through the wireless network 1104 are input to the receiver 1114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 1124. In a similar manner, signals to be transmitted are processed, including modulation and encoding, for example, by the DSP 1124. These DSP-processed signals are input to the transmitter 1116 for digital-to-analog (D/A) conversion, frequency up conversion, filtering, amplification, and transmission to the wireless network 1104 via the antenna 1120. The DSP 1124 not only processes communication signals, but also provides for receiver and transmitter control. For example, the gains applied to communication signals in the receiver 1114 and the transmitter 1116 may be adaptively controlled through automatic gain control algorithms implemented in the DSP 1124.

Network access is associated with a subscriber or user of the wireless device 1102 via a memory module, such as a memory module 1130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 1132 of the wireless device 1102 in order to operate in conjunction with the wireless network 1104. Alternatively, the wireless device 1102 may have an integrated identity module for use with systems such as Code Division Multiple Access (CDMA) systems.

The wireless device 1102 also includes a battery interface 1136 for receiving one or more rechargeable batteries 1138. The battery 1138 provides electrical power to at least some of the electrical circuitry in the wireless device 1102, and the battery interface 1136 provides a mechanical and electrical connection for the battery 1138. The battery interface 1136 is coupled to a regulator (not shown) which provides power V+ to the circuitry of the wireless device 1102.

The wireless device 1102 includes a microprocessor 1140 which controls the overall operation of the wireless device 1102. Communication functions, including at least data and voice communications, are performed through the communication subsystem 1112. The microprocessor 1140 also interacts with additional device subsystems such as a primary display 1142, a secondary display 1143, a flash memory 1144, a random access memory (RAM) 1146, a read-only memory (ROM) 1148, auxiliary input/output (I/O) subsystems 1150, a data port such as serial port 1152, a keyboard or keypad 1154, a speaker or audio port 1156 for connecting to, for example a set of headphones or an earpiece, a microphone 1158, a clickable thumbwheel or thumbwheel 1160, a short-range communications subsystem 1162, and any other device subsystems generally designated as 1164. Some of the subsystems shown in FIG. 11 perform communication-related functions, whereas other subsystems may provide "resident" or on-device functions. Notably, some subsystems, such as the keypad 1154, the primary display 1142, the secondary display 1143, and the clickable thumbwheel 1160, for example, may be used for both communication-related functions, such as displaying notifications or entering a text message for transmission over the wireless network 1104, and executing device-resident functions such as a clock, a calculator or a task list. Operating system software used by the microprocessor 1140 is preferably stored in a persistent store such as the flash memory 1144, which may alternatively be the ROM 1148 or similar storage element. Those skilled in the art will appreciate that the operating system, specific device applications, or parts thereof, may be temporarily loaded into a volatile store such as the RAM 1146.

The microprocessor 1140, in addition to its operating system functions, enables execution of software applications on the wireless device 1102. A predetermined set of applications that control basic device operations, including data and voice communication applications, will normally be installed on the wireless device 1102 during or after manufacture. The wireless device 1102 may include a personal information manager (PIM) application having the ability to organize and manage data items relating to a user such as, but not limited to, instant messaging, email, calendar events, voice mails, appointments, and task items. One or more memory stores may be available on the wireless device 1102 to facilitate storage of information, such as the flash memory 1144, the RAM 1146, the ROM 1148, the memory module 1130, or other types of memory storage devices or FLASH memory cards represented by the other device subsystems 1164, such as Secure Digital (SD) cards or mini SD cards, etc. In accordance with the present disclosure, data provided in anchored memory, non-frozen memory, or both for the purposes of patching the ROM mask is stored in a non-volatile memory and uploaded into RAM 1146 upon initialization of the device 1102.

The PIM and/or media applications have the ability to send and receive data items via either the wireless network 1104 or a link to a computer system. The link to the computer system may be via the serial port 1152 or the short-range communications subsystem 1162. In an example embodiment, PIM and/or media data items are seamlessly combined, synchronized, and updated via the wireless network 1104, with the wireless device user's corresponding data items stored and/or associated with a host computer system thereby creating a mirrored or partially mirrored host computer on the wireless device 1102 with respect to such items. This may be advantageous where the host computer system is the wireless device user's office computer system. Additional applications, including upgrades to the ROM 1148, may also be loaded onto the wireless device 1102 through the wireless network 1104, the auxiliary I/O subsystem 1150, the serial port 1152, the short-range communications subsystem 1162, or any other suitable subsystem 1164, and installed by a user in the RAM 1146 or a non-volatile store such as the ROM 1148 for execution by the microprocessor 1140. Such flexibility in application installation increases the functionality of the wireless device 1102 and may provide enhanced on-device functions, communication-related functions, or both. For example, secure communication applications may enable electronic commerce functions and other such financial transactions to be performed using the wireless device 1102.

In a data communication mode, a received data signal representing information such as a text message, an email message, a media file to be transferred, or Web page download will be processed by the communication subsystem 1112 and input to the microprocessor 1140. The microprocessor 1140 will further process the signal for output to the primary display 1142, secondary display 1143, or alternatively to the auxiliary I/O device 1150. A user of the wireless device 1102 may also compose data items, such as email messages, for example, using the keypad 1154 and/or the clickable thumbwheel 1160 in conjunction with the primary display 1142 and possibly the auxiliary I/O device 1150. The keypad 1154 may be either a complete alphanumeric keypad or telephone-type keypad. These composed items may be transmitted through the communication subsystem 1112 over the wireless network 1104 or via the short range communication subsystem 1162.

For voice communications, the overall operation of the wireless device 1102 is similar, except that the received signals would be output to the speaker or audio port 1156 and signals for transmission would be generated by a transducer such as the microphone 1158. Alternative voice or audio I/O subsystems, such as a voice message recording subsystem, may also be implemented on the wireless device 1102. Although voice or audio signal output is typically accomplished primarily through the speaker or audio port 1156, the primary display 1142 or the secondary display 1143 may also be used to provide an indication of the identity of a calling party, duration of a voice call, or other voice call related information. Stereo headphones or an earpiece may also be used in place of the speaker 1156.

The serial port 1152 is normally implemented in a personal digital assistant (PDA) type communication device for which synchronization with a user's computer is a desirable, albeit optional, component. The serial port 1152 enables a user to set preferences through an external device or software application and extends the capabilities of the wireless device 1102 by providing for information or software downloads to the wireless device 1102 other than through the wireless network 1104. The alternate download path may, for example, be used to load software or data files onto the wireless device 1102 through a direct, reliable and trusted connection.

The short-range communications subsystem 1162 is an additional optional component which provides for communication between the wireless device 1102 and different systems or devices, which need not necessarily be similar devices. For example, the subsystem 1162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another example embodiment, the short-range communications subsystem 1162 may be a wireless networking communications subsystem, conforming to IEEE 802.11 standards such as one or more of 802.11b, 802.11g, or 802.11n.

Figure 12:
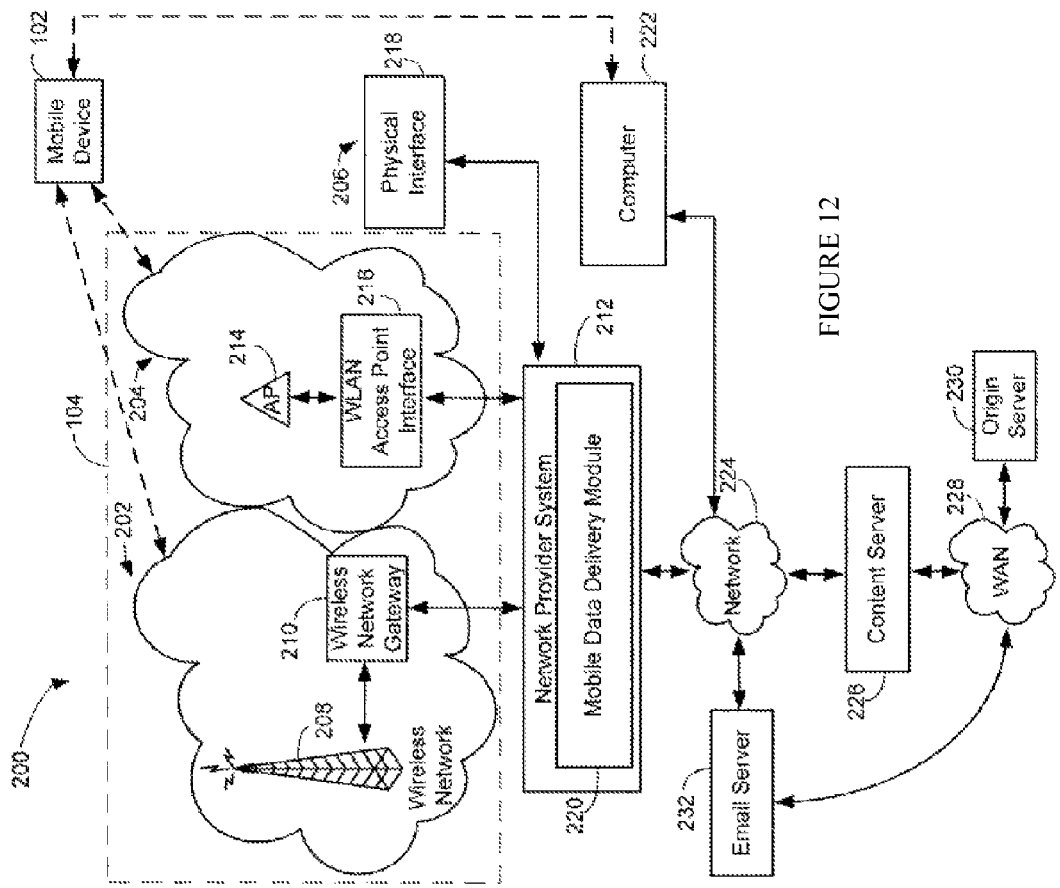
FIG. 12 shows in block diagram form a communication system suitable for providing the operating environment of the wireless device of FIG. 1 in accordance with an example embodiment.

Reference is next made to FIG. 12, which shows a communication system 1200 suitable for use with the wireless device 1102 shown in FIG. 11. The communication system 1200 generally includes one or more wireless devices 1102 (only one of which is shown in FIG. 12) and the wireless network 1104. The wireless network 1104 may include a wireless Wide Area Network (WAN) 1202, a Wireless Local Area Network (WLAN) 1204, and/or other interfaces 1206 (which may not necessarily be wireless).

Referring to FIG. 12, the wireless WAN 1202 may be implemented as a packet-based cellular or mobile network that includes a number of base stations 1208 (one of which is shown in FIG. 12) where each of the base stations 1208 provides wireless Radio Frequency (RF) coverage to a corresponding area or cell. The wireless WAN 1202 is typically operated by a cellular network service provider that sells subscription packages to users of the wireless devices 1102. The wireless WAN 1202 includes a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 12, the communications system 1200 also includes a wireless network gateway 1210 and one or more network provider systems 1212. The wireless network gateway 1210 provides translation and routing services between the network provider system(s) 1212 and the WAN 1202, which facilitates communication between the wireless devices 1102 and other devices (not shown) connected, directly or indirectly, to the network provider system 1212.

The WLAN 1204 includes a network which in some examples conforms to IEEE 802.11 standards such as one or more of 802.11b, 802.11g, or 802.11n; however, other communications protocols may also be used for the WLAN 1204. The WLAN 1204 includes one or more wireless RF Access Points (AP) 1214 (one of which is shown in FIG. 12) that collectively provide a WLAN coverage area. For the example embodiment depicted in FIG. 12, the WLAN 1204 is operated by an enterprise (for example, a business or university in a building or campus type environment) and the access points 1214 are connected to an access point (AP) interface 1216. The AP interface 1216 provides translation and routing services between the access points 1214 and the network provider system 1212 to facilitate communication between two or more of the wireless devices 1102 and other devices (e.g., such as desktop computers) connected, directly or indirectly, to the network provider system 1212. The AP interface 1216 is implemented using a computer, for example, a server running a suitable computer program or software.

According to an example embodiment, the other interfaces 1206 may be implemented using a physical interface indicated by reference 1218. The physical interface 1218 includes an Ethernet, Universal Serial Bus (USB), Firewire, or infrared (IR) connection implemented to exchange information between the network provider system 1212 and the wireless device 1102.

The network provider system 1212 includes a server or server modules or a number of servers or server modules which are typically located behind a firewall (not shown). The network provider system 1212 may include a number of modules including a mobile data delivery module 1220. Various modules running on the network provider system 1212 may be implemented as a number of services running on a single server or as a number of interconnected servers each running a software program to implement the functionality of the respective module. The network provider system 1212 provides access for the wireless devices 1102, through either the wireless WAN 1202, the WLAN 1204, or the other connection 1206 to the devices connected, for example, through an enterprise network 1224 (e.g., an intranet), to the network provider system 1212. In an example embodiment, the data delivery module 1220 is implemented on a computer, such as the network provider system 1212.

The enterprise network 1224 includes a local area network, an intranet, the Internet, a direct connection, or combinations thereof. The enterprise network 1224 may include an intranet for a corporation or other type of organization. In at least some example embodiments, the network provider system 1212 is part of the enterprise network 1224, and is located behind a corporate firewall and connected to the wireless network gateway 1210 through the Internet. A computer 1222 (e.g., a desktop or laptop computer) belonging to the user of the wireless device 1102 is typically connected to the enterprise network 1224. As described earlier, the wireless device 102 can be temporarily and directly connected to the computer 1222 using, for example, the serial port 1152. Alternatively, the wireless device 1102 may communicate with the computer 1222 using the communication subsystem 1112 and the WAN 1202 and/or the short-range communications subsystem 1162 and the WLAN 1204.

As shown in FIG. 12, an application/content server 1226 may be connected to the enterprise network 1224 and also to another network, for example a Wide Area Network (WAN) 1228. In some example embodiments, an email server 1232 and/or the content server 1226 form part of the enterprise network 1224. The WAN 1228 may further connect to other networks. The WAN 1228 may include or be configured with the Internet, a direct connection, a LAN, a wireless communication link, or any combination thereof. Content providers, such as Web servers, may be connected to the WAN 1228, an example of which is shown in FIG. 12 as an origin server 1230.

According to an example embodiment, the mobile data delivery module 1220 provides connectivity between the wireless WAN 1202 and the WLAN 1204 and the other connection 1206 and devices and/or networks connected directly or indirectly to the network provider system 1212. In an example embodiment, the connectivity provided may be Hypertext Transfer Protocol (HTTP) based connectivity providing an Internet based service connection to devices connected to the wireless WAN 1202, the WLAN 1204, or the other connection 1206 and devices and/or networks connected directly or indirectly to the network provider system 1212. The network 1224, the application/content server 1226, the WAN 1228, and the origin server 1230, are individually and/or collectively in various combinations a content source for the network provider system 1212. It will be appreciated that the system shown in FIG. 12 includes but one possible communication network or configuration of a multitude of possible configurations for use with the wireless devices 1102.

While the blocks of the methods in FIGS. 2 to 10 are shown as occurring in a particular order, it will be appreciated by those skilled in the art that many of the blocks are interchangeable and may occur in different orders than that shown without materially affecting the end results of the methods.

Additionally, while the present disclosure relates to code or functions that reside on ROM, this is not meant to limit the scope of possible applications of the described methods and tools. Any system that utilizes static code on, for example FLASH memory magnetic or optical disk media or other storage devices, could be utilized without causing departure from the spirit and scope of the present disclosure.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology.

The invention claimed is:

1. A method for creating Read Only Memory (ROM) mask content, the method comprising:
   creating a plurality of single ROM object files;
   inserting a respective patch reference into selected ones of functions and data objects in said ROM object files, each respective patch reference pointing to a respective memory location;
   linking said plurality of single ROM object files together into a combined file;
   detecting patch reference errors in said selected ones of functions and data objects by validating a start memory location of the respective patch reference and the respective pointed-to memory location;
   correcting said detected patch reference errors for inappropriate patch references; and
   generating said mask content from said combined file, wherein said detecting patch reference errors comprises identifying patch references that originate from frozen memory and end in non-frozen memory, and patch references that originate from frozen memory and end in frozen memory and are not patch references to a static function.

2. The method of claim 1, wherein said creating a plurality of single ROM object files comprises:
   creating a source code file;
   converting a file format of said source code file into assembly code and compiling an assembly file; and
   selecting at least one of functions and data objects in said assembly file in accordance with a predetermined parameter; and
   the inserting comprises inserting said patch reference to each said selected ones of functions and data objects.

3. The method of claim 2, wherein said inserting said patch reference comprises adding a data indirection pointer to each selected ones of data objects.

4. The method of claim 3, wherein said inserting said patch reference comprises placing all of said data indirection pointers in a same source file.

5. The method of claim 3, wherein said inserting said patch reference comprises using multiple source files to hold said data indirection pointers.

6. The method of claim 2, wherein said inserting said patch reference comprises adding a thunk.

7. The method of claim 2, wherein said selecting comprises selecting ones of functions and data objects exceeding a predetermined size threshold.

8. The method of claim 2, wherein said selecting comprises selecting ones of functions and data objects in accordance with a position in said assembly file.

9. The method of claim 1, wherein said detecting patch reference errors comprises sending said patch reference errors to an error file.

10. The method of claim 1, wherein all steps of the method are performed by a processor.

11. The method of claim 1 wherein said each respective patch reference is unchangeable in a respective ROM upon creation of the respective ROM using the generated mask content.

12. The method of claim 1 wherein said detecting patch reference errors comprises validating patch references that respectively originate in frozen memory and point to a respective unmovable memory location in anchored memory in a corresponding Random Access Memory (RAM).

13. A method for automatically creating a software patch for a ROM mask, the method comprising:
   receiving a list of patchable functions and/or data objects, each patchable function and/or data object comprising a patch reference having been inserted into the respective patchable function and/or data object at the time of creation of said ROM mask, each respective patch reference pointing to a respective memory location each respective patch reference having been validated at least partly by validating a start memory location of the respective patch reference and by validating the respective pointed-to memory location such that patch references that originated from frozen memory and ended in non-frozen memory had been identified, and patch references that originated from frozen memory and ended in frozen memory and were not patch references to a static function had been identified;
   comparing an original ROM assembly file used to make the ROM mask with an updated ROM assembly file;
   applying a first set of rules if the patchable function or data object has a patch reference and recording results in an output file;
   applying a second set of rules if the patchable function or data object does not have a patch reference and recording results in said output file; and
   creating the software patch from the output file.

14. The method of claim 13, wherein said applying a first set of rules comprises:
   discarding deleted functions or data objects and pointing the patch reference to an error;

renaming changed functions in ROM with a patch suffix and saving them to the output file;
discarding unchanged functions or data objects;
renaming the unchanged functions that are not in ROM and saving them to the output file; and
saving changed data objects to the output file.

15. The method of claim 13, wherein said applying a second set of rules comprises:
saving functions that are not in ROM to the output file;
discarding functions that are in ROM and have not changed;
logging an error for functions that are in ROM, have changed, and are not static;
saving the functions that are in ROM, have changed, and are static, marking all calling function as changed, and reprocessing said all calling functions;
logging an error for all changed data objects; and
discarding unchanged data objects.

16. The method of claim 13, further comprising creating the software patch as a multi-version software patch by:
creating N ROM patch object files individually;
creating a boot code object file comprising ROM detection code; and
linking the N ROM patch object files and the boot code object files together to generate a single executable file that supports N ROM versions.

17. The method of claim 16, wherein said creating a boot code object file comprising ROM detection code comprises providing code for:
reading a ROM mask type and version number from a processor of a target device;
searching for a ROM patch image corresponding to the ROM mask type and version number; and
loading a corresponding ROM patch image into the processor.

18. The method of claim 13, wherein all steps of the method are performed by a processor.

19. The method of claim 13 wherein each respective patch reference is unchangeable in a respective ROM upon creation of the respective ROM using the ROM mask.

* * * * *